United States Patent [19]

Ichinose et al.

[11] E Re. 30,573

[45] Reissued Apr. 14, 1981

[54] CROWN CLOSURE

[75] Inventors: Isao Ichinose; Mitsuhiro Sakemoto, both of Hiratsuka; Noboru Suzuki, Chigasaki, all of Japan

[73] Assignee: Japan Crown Cork Co., Ltd., Tokyo, Japan

[21] Appl. No.: 76,732

[22] Filed: Sep. 18, 1979

Related U.S. Patent Documents

Reissue of:

[64] Patent No.: 4,111,323
Issued: Sep. 5, 1978
Appl. No.: 774,651
Filed: Mar. 4, 1977

[30] Foreign Application Priority Data

Mar. 17, 1976 [JP] Japan ..... 51-28121
Apr. 23, 1976 [JP] Japan ..... 51-45436

[51] Int. Cl.[3] ..... B65D 41/12

[52] U.S. Cl. ..... 215/230; 40/307; 40/311; 215/328; 260/DIG. 37; 428/202; 428/204; 428/209; 428/413; 428/416; 428/461; 428/501; 428/506; 428/515; 428/516; 428/518

[58] Field of Search ..... 215/230, 328, DIG. 2, 215/DIG. 4; 260/DIG. 37; 428/461, 204, 516, 209, 202, 413, 416, 518, 515, 501, 506; 40/311, 307

[56] References Cited

U.S. PATENT DOCUMENTS

| | | | |
|---|---|---|---|
| 3,147,874 | 9/1964 | Hundt | 215/347 |
| 3,233,770 | 2/1966 | Zapata | 113/121 A |
| 3,361,281 | 1/1968 | Kehe | 215/228 |
| 3,487,124 | 12/1969 | Yeshin | 428/461 |
| 3,557,987 | 1/1971 | Singer | 215/230 |
| 3,633,781 | 1/1972 | Zapata | 215/218 |
| 4,012,270 | 3/1977 | Fitko | 428/416 |
| 4,034,132 | 7/1977 | Manuel | 428/416 |
| 4,062,997 | 12/1977 | Hotta | 428/416 |

FOREIGN PATENT DOCUMENTS 1484209 9/1977 United Kingdom .

*Primary Examiner*—Ellis P. Robinson
*Attorney, Agent, or Firm*—Wenderoth, Lind & Ponack

[57] ABSTRACT

A crown closure having a polyolefin liner that can be readily removed, said crown closure comprising a crown shell having a primer layer on its inner surface and a polyolefin liner applied to the inside of said crown shell, characterized in that said primer layer is a two-component priming consisting of an undercoat layer containing [a polyethylene oxide] *an oxidized polyethylene* and a topcoat layer containing [a polyethylene oxide] *an oxidized polyethylene* and at least one other compatible resin, with the provision of a printing layer of indicia at the interface between said undercoat and topcoat layers or atop said topcoat layer. Aforesaid crown closure can be prepared by providing at one face of a metal stock sheet a primer undercoat layer containing [a polyethylene oxide] *an oxidized polyethylene,* printing indicia thereon, providing atop said undercoat layer a primer topcoat layer containing [a polyethylene oxide] *an oxidized polyethylene* and at least one other compatible resin, and thereafter forming said metal stock sheet into crown shells in such a manner that said coating layers come to the inside of the shells followed by depositing a polyolefin mass in said shells and molding same into the form of liners.

10 Claims, 5 Drawing Figures

CROWN CLOSURE

Figure 1:
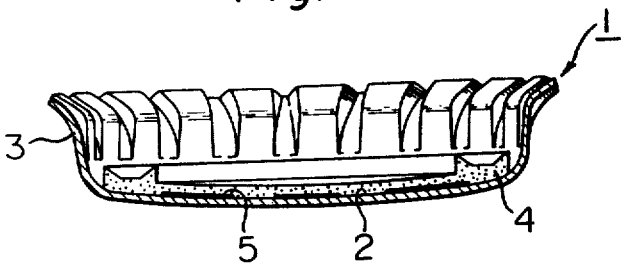

Matter enclosed in heavy brackets [ ] appears in the original patent but forms no part of this reissue specification; matter printed in italics indicates the additions made by reissue.

This invention relates to crown closures and, in particular, to a prize crown closure having a polyolefin liner. More specifically, the invention concerns a prize crown closure in which the indicia provided on the inside surface of the crown shell can be readily removed from the crown shell in a state in which the indicia are transferred to the polyolefin liner.

For the purpose of publicizing and promoting the sales of bottled products or for the purpose of identifying the bottled products such as their lot number, date of manufacture, plant of manufacture, etc., it has been a frequent practice to seal bottle mouths with crown closures whose inner top surface is printed with such indicia as "hit" or "miss" (for a prize) or other letters, characters, symbols, designs, etc. (this crown closure will be referred to herein as "prize crown closure"). The conventional prize crown closure is usually manufactured in the following manner. The inner top surface of the crown shell, after being printed with the prize markings, is uniformly coated with a semiadhesive lacquer, whose ability to adhere to the vinyl chloride compound used as the liner is weak. A vinyl chloride compound sol is then introduced into the inner surface of the crown shell, and the sol is spread out over the inside surface either by rotating the crown shell itself or by forming with a molding punch. This is followed by gelling and foaming the sol in a hot oven. However, in the case of such a prize crown closure, the crown shell itself, after having been removed of the liner, must be mailed to the manufacturer of the bottled product. Since the crown shell is made of a rigid material, there are such dangers as that the envelope will become damaged in transit, or that the rigid crown shell will cause troubles to the machines during such mechanical operations as sorting and stamping at the post office.

Further, there is also the problem of environmental pollution by means of the vinyl chloride resin plasticizer in the case of the vinyl chloride compound. Hence, it is especially desirable to avoid the use of this compound in those cases where the crown closures are to be used as caps of containers of beverages and foods. Lately, the use of polyolefins as the liner material instead of the vinyl chloride compound has been suggested. However, in the case of the polyolefins there is the shortcoming that their adhesiveness to an anticorrosive primer (the under/coat) that has been usually used with the crown closures heretofore is poor. Hence, various special primers have been suggested.

Of these primers, that containing [a polyethylene oxide] *an oxidized polyethylene* having attracted our attention, we made extensive researches into the method of manufacturing a prize crown closure using such a primer. As a consequence, we found that when the primer layer containing [a polyethylene oxide] *an oxidized polyethylene* was divided and applied as two layers, the adhesiveness between the two layers would become semiadhesive. We thus arrived at the present invention.

It is therefore an object of the present invention to provide a crown closure having a polyolefin liner that can be readily removed.

Another object of the invention is to provide a process for manufacturing the aforesaid crown closure.

Other objects and advantages of the invention will become apparent from the following description.

According to this invention, there is provided a crown closure having a polyolefin liner that can be readily removed consisting of a crown shell having a primer layer on its inner surface and a polyolefin liner applied to the inside of the crown shell, characterized in that the primer layer is made up of two layers, one an under coat layer containing [a polyethylene oxide] *an oxidized polyethylene* and the other a top coat layer containing [a polyethylene oxide] *an oxidized polyethylene* and at least one other resin, with the provision of a printing layer of indicia at the interface between said under coat and top coat layers or atop said top coat layer.

The crown closures that are presently in wide use are made in the following manner. One face of a stock sheet such as a tinplate or chromium-plated sheet steel is lacquered and then printed with the manufacture's name, merchandise name, amount contained, etc., while to the other face is applied a primer (lacquer) that is adhesive to liners. The sheet is then blanked out with a punch press to form the crown sheels, after that and liners are then applied to the crown shells to manufacture the crown closures.

As indicated hereinbefore, the prize crown closure of the present invention is characterized by its use of a polyolefin for its liner material and by the fact that the primer layer is a two-coat layer consisting of an under coat layer containing [a polyethylene oxide] *an oxidized polyethylene* and a top coat layer containing [a polyethylene oxide] *an oxidized polyethylene* and other compatible resins. This primer layer can, if necessary, have, in addition to the foregoing two layers, one or more lacquered layers below said under coat layer.

The polyolefins to be used as the liner material in the invention crown closure include not only polyethylene, which is most suitable, but also such polyolefins as polypropylene, the ethylene/butene-1 copolymer, polybutene-1, the ethylene/hexene copolymer, the ethylene/propylene copolymer and the ethylene/propylene/nonconjugated diene terpolymer or the olefin copolymers consisting predominantly of an olefin (at least 50 mol %, preferably 80 mol % or more) with a small amount of an ethylenically unsaturated monomer other than an olefin, or the modified polyolefins. As such olefin copolymers or modified polyolefins, there can be mentioned, for example, the ethylene-vinyl acetate copolymer (EVA), the partial saponification product of an ethylene-vinyl acetate copolymer (EVAL), the ethylene-acrylic acid copolymer, the ethylene-methyl methacrylate copolymer, the unsaturated carboxylic acid-modified polyethylene (usable as the unsaturated carboxylic acid are such compounds as, for example, maleic acid, acrylic acid and methacrylic acid, and the esters of these acids), the unsaturated carboxylic acid-modified polypropylene (usable as the unsaturated carboxylic acids are such compounds as, for example, maleic acid and acrylic acid, and the esters of these acids), the ionomers and the chlorosulfonated polyethylenes.

These olefin resins may be used either singly or as a blend of two or more thereof. It is also possible to use polyethylene, polypropylene or EVA after blending these resins with, say, 1 to 60% by weight for one or more of such elastomers as ethylene-propylene rubber (EPR), ethylene-propylene-diene rubber (EPDM), polyisobutylene (PIB), butyl rubber (IIR), polybutadiene (PB), natural rubber (NR), sterospecific polyisoprene, nitrile rubber (NBR), the styrene-butadiene copolymer, the styreneisoprene copolymer and polychloroprene (CR).

When considered from the standpoint of their moldability to liners, it is advantageous for the foregoing olefin resins to have melt indexes that generally range from 0.1 to 50, and preferably 1 to 20.

It is also possible to incorporate in these polyolefins such additives as the antioxidants or thermal stabilizers, e.g., of the organic sulfur, organic nitrogen and organic phosphorus types, the lubricants, e.g., metallic soap and the other fatty acid derivatives, and the fillers or pigments, e.g., calcium carbonate, white carbon, titanium white, magnesium carbonate, magnesium silicate, carbon black and the various clays, in the usual proportions in accordance with the per se known recipes.

The polyolefins used in the present invention can, as required, be also incorporated with a cross-linking agent or a blowing agent, either singly or in combination, to render them into a cross-linked, foamed or cross-linked and foamed polyolefin liner.

Usable as these cross-linking agents and blowing agents are the following compounds. As the cross-linking agents, usable are those types which decompose in the neighborhood of the processing temperature (softening temperature) of the resin used. Mention can be made of such organic peroxides as, for example, dicumyl peroxide, di-t-butyl peroxide, cumyl hydroperoxide and 2,5-dimethyl-2,5-di(t-butyl peroxide)hexene-3. On the other hand, usable as the blowing agents are those types which likewise decompose in the neighborhood of the temperature at which the resin used is processed, including such compounds as, for example, 2,2'-azobisisobutyronitrile, azodicarbonamides or 4,4-oxybisbenzenesulfonyl hydrazide. The foregoing cross-linking agents are used in an amount of 0.1–5% by weight of the resin, while the blowing agents are used in an amount of 0.2–10% by weight of the resin.

The [polyethylene oxides] *oxidized polyethylene* used in the primer layer of the crown closure of this invention [are] *is* obtainable by oxidizing either polyethylene or a copolymer predominantly of ethylene in the molten or solution state, and *such oxidation products* are known per se. While there is imposed no particular restriction as to the average molecular weight of the [polyethylene oxides] *oxidized polyethylene* that can be used, usually preferred are those of an average molecular weight of 1000–50,000, and especially to be preferred are those having an average molecular weight of 4000–10,000.

The degree of oxidation of the aforesaid [polyethylene oxide] *oxidized polyethylene* can be varied in accordance with the adhesive strength that is required between the crown shell and the polyolefin liner. In the case of the primer under coat layer the degree of oxidation is not especially strict and can be varied over a wide range, it being possible to use one whose content of oxygen is as low as about 0.1% by weight or less, or one whose oxygen content is as high as about 10% by weight or even higher. However, usually one whose oxygen content is 0.1–10% by weight, and more preferably 0.5–6.0% by weight, is used with advantage. Again, the degree of oxidation of the [polyethylene oxide] *oxidized polyethylene* used as the primer top coat layer is also not critical. But for maintaining its high adhesiveness to the polyolefin liner, the oxygen content of the [polyethylene oxide] *oxidized polyethylene* of the primer top coat layer is desirably in the range of 0.1–10% by weight, and preferably 0.5–6.0% by weight. The term "oxygen content," as used herein and the appended claims, denotes percentage by weight of bound oxygen (O) that is present in a given quantity of the [polyethylene oxide] *oxidized polyethylene.*

The [polyethylene oxide] *oxidized polyethylene* used in the primer under coat layer and primer top coat layer can be of the same or differing oxygen contents. In the latter case, no trouble is experienced regardless of whether the oxygen content of the under coat layer is smaller or greater than that of the top coat layer, provided that the oxygen content is in the aforementioned range.

The bound oxygen that is present in the [polyethylene oxide] *oxidized polyethylene* is believed to be present therein partly in the form *of* the carboxyl group, while a part of the rest is in such forms as the hydroxyl group, ether linkage and carbonyl group. The degree of oxidation (degree of oxygen content) of the [polyethylene oxide] *oxidized polyethylene* can be ascertained by measuring the acid value of the [polyethylene oxide] *oxidized polyethylene.* The [polyethylene oxides] *oxidized polyethylene* used in the present invention [are] preferably [those having] *has* an acid value (AV) of 2–100, and especially 5–40, for achieving the objectives of this invention.

On the other hand, as to the density of the [polyethylene oxide] *oxidized polyethylene,* which is closely related to its degree of crystallinity, it is desired that this be relatively great, i.e., generally speaking, from 0.90 to 1.0 gram per centimeter, and especially 0.96 to 1.0 gram per centimeter.

The [polyethylene oxide-containing] *oxidized polyethylene-containing* layer constituting the under coat layer of the primer layer can be composed of only the [polyethylene oxide] *oxidized polyethylene,* or it can be a mixture of [polyethylene oxide] *oxidized polyethylene* with other compatible resins. As these other compatible resins, there can be named those thermosetting or thermoplastic resins that are usually used as a vehicle of the lacquer used for coating the crown shell such, for example, as the phenolic resins, epoxy resins, amino resins such as melamine or urea, oleoresinous type resins, alkyd resins, acrylic resins, or the vinyl resins such as the vinyl chloride-vinyl acetate copolymer, vinyl chloride-vinyl acetate-maleic acid copolymer and vinylbutyral. These resins may be used either singly or in combinations of two or more thereof. Of the foregoing resins, those referred to as the thermosetting type are usually to be preferred, especially preferred being the phenol-epoxy resins and the phenol-epoxy-vinyl resins.

When using these other compatible resins, the weight ratio in which the [polyethylene oxide] *oxidized polyethylene* is used to these other resins may be in the range of 2:98–99:1, and preferably 5:95–60:40.

This primer under coat layer can be provided on the entire inner surface of the crown shell, or it can be provided on only the top portion where the liner is to be adhered.

On the other hand, it is indispensable in the case of the top coat layer of the primer layer that it contains other compatible resins in addition to the [polyethylene oxide] *oxidized polyethylene* such as hereinbefore described. As to these other compatible resins that are usable in the top coat layer, a choice can be made from those indicated hereinbefore with reference to the under coat layer. These other compatible resins are advantageously used with the [polyethylene oxide] *oxidized polyethylene* in a weight ratio of the [polyethylene oxide] *oxidized polyethylene* to these compatible resins ranging from 1:99 to 50:50, and especially 3:97 to 30:70.

When these other compatible resins are present in both the under coat and top coat layers of the primer layer, the rates in which the [polyethylene oxide] *oxidized polyethylene* is present in the under coat and top coat layers should preferably be the same or otherwise greater in the under coat layer.

The primer top coat layer may be provided on the entire inner surface of the crown shell, or it may be provided on only the top portion where the liner is to be adhered.

In forming the primer under coat and top coat layers, the foregoing [polyethylene oxide] *oxidized polyethylene* and the other compatible resins are dissolved or dispersed in a solvent in the proportions indicated hereinbefore and a concentration suitable for application. The solvents that can be used for this purpose include, for example, such aromatic hydrocarbons as xylene and toluene, and such ketones as acetone, methyl ethyl ketone and methyl isobutyl ketone.

These primer under coat and top coat layers are applied in such amounts that, after drying, the nonvolatile portion, i.e., the total weight of the [polyethylene oxide] *oxidized polyethylene* and the other compatible resins per unit area, amounts to 5–500 mg/dm$^2$, and preferably 10–100 mg/dm$^2$, in the case of the under coat layer, and 5–500 mg/dm$^2$, and preferably 20–100 mg/dm$^2$ in the case of the top coat layer.

The crown closure of this invention can be manufactured in the following manner. First, [a polyethylene oxide] *an oxidized polyethylene-containing* primer under/coat layer is provided on one face of a metal stock sheet. Next, (a) indicia are printed on this under coat layer, after which a primer top coat layer containing [a polyethylene oxide] *an oxidized polyethylene* and other compatible resins is provided atop this printed under coat layer; or (b) a primer top coat layer containing [a polyethylene oxide] *an oxidized polyethylene* and other compatible resins is provided atop the aforesaid under coat layer followed by printing the indicia on the top coat layer. The metal stock sheet is then formed into a crown shell in such a manner that the coated layers come to the inside of the crown shell. Next, a polyolefin mass is deposited in the shell and molded into the form of a liner.

The crown shell can be provided with the foregoing primer layer by operating in the same manner as in the case with the conventional method of forming the crown shell. For example, one face of a metal stock sheet such as a tinplate, chromium-plated sheet steel or sheet aluminum is lacquered and then imprinted with the desired indicia, while the other face of the sheet is provided with a primer layer. In this case, the primer layer may be applied directly, or in a preferred practice a lacquer composition not containing [a polyethylene oxide] *an oxidized polyethylene* is first applied to the surface of the stock sheet followed by the application thereon of the primer layer.

In coating the [polyethylene oxide] *oxidized polyethylene* singly it is best used in the form of either a solution, suspension or emulsion. For instance, it can be rendered into a suspension or emulsion, utilizing the fact that it dissolves in xylene when hot. Or it can be made into a solution by dissolving it in decalin. When the [polyethylene oxide] *oxidized polyethylene* is to be combined with other resins and used as a primer composition, this can be accomplished by adding the solution, etc., of these other resins to the solution of the base resin and ensuring that the *oxidized* polyethylene is dispersed uniformly and finely in the primer composition.

The application of the primer under coat and top coat layers can be carried out by employing the coating methods which per se are known. For example, the employable procedures include such techniques as dip coating, spray coating, the use of roll coaters and bar coaters, as well as the electrostatic coating, electrodeposition coating and powder coating techniques.

While the applied under coat layer need only be dried before being submitted to the following steps of printing the indicia and coating of the top coat layer, a greater advantage is realized by first submitting the under coat layer to a baking treatment at at least 130° C., more suitably at 150°–250° C., before being transferred to the next step.

After completion of the application of the primer under coat layer and baking and, as hereinafter indicated, with or without printing the indicia, the top coat layer is applied. The applied primer top coat layer may be just dried or, if necessary, it may be baked on at the hereinbefore-indicated temperatures.

In making the prize crown closure of this invention, the indicia are printed either at the interface of the primer under coat layer and the primer top coat layer or atop the top coat layer. The printing of the indicia may be done on the surface of the under coat layer after its baking treatment or at that stage where the top coat layer has been applied and just dried or after having completed its baking treatment.

As the ink for printing the indicia, those which are used to print on metals and are usually used for printing crown closures can be used. For example, usable are those obtained by using as a binder such a resin as an alkyd resin, urea resin, epoxy resin, phenolic resin, acrylic resin or vinyl resin and dissolving or dispersing such a binder along with a pigment and other additives in a suitable solvent such, for example, as kerosine, methyl isobutyl ketone, methyl ethyl ketone, methyl cellosolve and glycol.

The printing of the indicia can be carried out by such usual methods as lithographic, offset and relief printing techniques. Further, it can be monochromatic or multicolored, or it can be printed in a single layer or several layers. Again, the printing layer of the indicia may be provided in a part of the top portion of the crown shell or, if necessary, it may be provided on the whole of the top portion of the crown shell. This printing can be baked at the hereinbefore-indicated temperatures, if necessary.

The stock sheet provided with two layers of primer layers and the printing layer of indicia, after being baked, if necessary, at the hereinbefore-indicated temperature, is then punch pressed in the form of crown shells and provided with polyolefin liners. The adhesion of the polyolefin liners is accomplished by the per se known adhesion method by melting or softening such as described in U.S. Pat. No. 3,135,019, 3,212,131 and 3,360,827, British Patent Specification No. 1,112,023, Japanese Patent Publication No. 19386/73, U.S. Pat.

No. 3,414,938, Japanese Laid-Open Patent Application No. 105689/74, and U.S. Pat. No. 3,278,985, the procedure consisting of placing prescribed amount of a polyolefin in the crown shell, melting or softening the polyolefin at 120°-250° C. and then pressing it to the desired shape.

The crown closure of the present invention will now be further described with reference to a preferred embodiment thereof such as shown in the accompanying drawings.

FIG. 1 is a schematic sectional view of a crown closure of the present invention. This crown closure is basically constituted of a crown shell 1 having a circular top portion 2 and a skirt portion 3 depending therefrom, and a polyolefin liner 4 deposited at the inner part of the crown shell 1, with the provision of a printing layer 5 of indicia in the primer layer between the top portion 2 of the crown shell and the liner 4.

Figure 2:
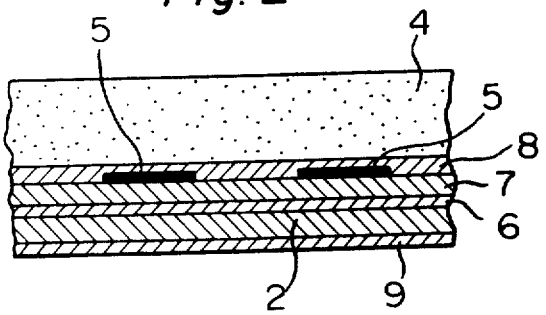
Figure 3:
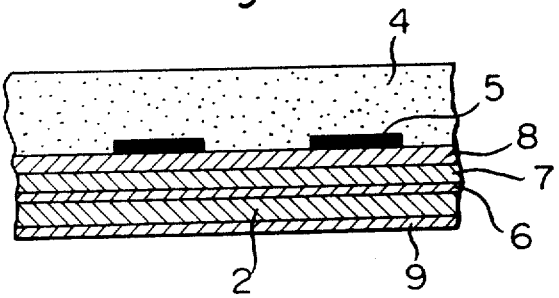

FIGS. 2 and 3 are sectional views on an enlarged scale of the top portion of the crown closure of this invention. While the primer layer of the crown closure of this invention can be provided directly on the top portion of the crown shell, it is preferably provided atop an undercoat lacquer layer 6, as shown in the drawings. This primer layer can be made up of two layers, an under coat layer 7 and a top coat layer 8. The printing layer 5 of indicia is present at the interface of the under coat layer 7 and the top coat layer 8 in FIG. 2, while it is present atop the top coat layer 8 in FIG. 3. The reference numeral 9 indicates the outside lacquered layer of the crown closure.

Figure 4:
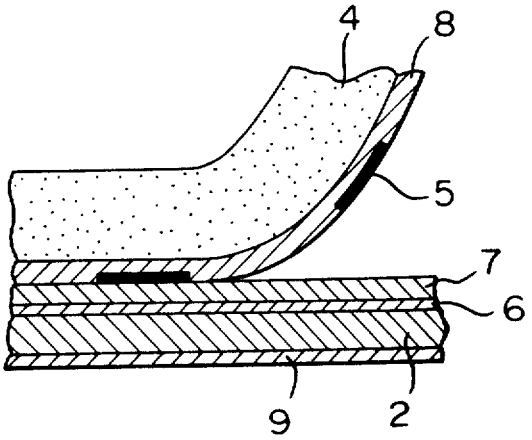
Figure 5:
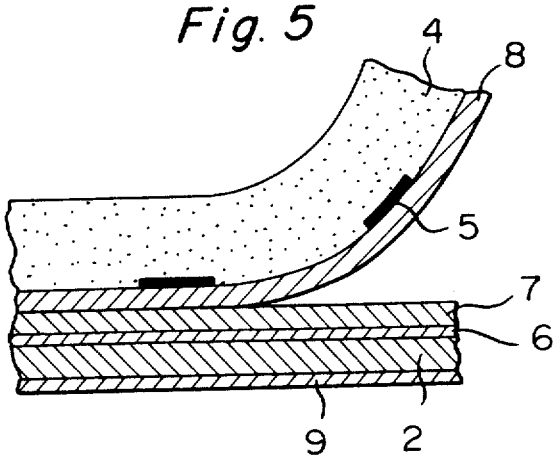

FIGS. 4 and 5 are sectional views on an enlarged scale depicting the stripping of the polyolefin liner and indicia from the crown shell.

The polyolefin liner 4 is adhered to the top coat layer 8 by melting or softening by the method described hereinbefore..

It was found that in the case of the invention crown closure of such a makeup the primer under coat layer 7 was firmly adhered to the top portion 2 of the crown closure and the primer top coat layer 8 was firmly bound to the polyolefin liner 4 that had been fused and adhered thereon, but surprisingly the adhesion between the primer under coat layer 7 and the primer top coat layer 8 did not become so firm (i.e., the adhesion between these two layers was in a semiadhered state). Thus, when the polyolefin liner 4 was stripped from the top portion 2 of the crown closure, it was found that the separation would take place at the area between the primer under coat layer 7 and the topcoat layer 8. In this case, as shown in FIG. 2, even when the printing layer 5 of indicia is present at the interface of the under coat layer 7 and the top coat layer 8, since it is usually more firmly adhered to the top coat layer 8 than the under coat layer 7, it comes off adhered to the top coat layer 8 when the polyolefin liner 4 is stripped.

It thus becomes possible in accordance with the crown closure of the present invention in stripping the polyolefin liner 4 from the crown shell to also strip the indicia at the same time as a transfer to said liner, as shown in FIG. 4 in the case of the crown closure of the type shown in FIG. 2, and as shown in FIG. 5 in the case of the type shown in FIG. 3.

The following examples will serve to more fully illustrate the present invention.

EXAMPLE 1

A coating material composed of 70 parts by weight of a vinyl chloride-vinyl acetate copolymer, 25 parts by weight of a bisphenol A type epoxy resin of molecular weight 370 and 5 parts by weight of an amino resin (butylated urea resin) and a solvent (a 2:1 volume ratio mixture of methyl isobutyl ketone and methyl cellosolve) was coated as a rust preventive undercoating lacquer to one face of an electroplated tinplate in such an amount as to provide a coating of 50 mg/100 $cm^2$ on drying. On top of this was applied as a primer under coat layer a priming obtained by dispersing in 85 parts by weight of a solvent (xylene) 15 parts by weight of [a polyethylene oxide] *an oxidized polyethylene* having an average molecular weight of 6500, an acid value of 28.0, a density of 1.00 g/cc and an oxygen content of 0.58 weight %, in such an amount as to provide a coating of 5 mg/100 $cm^2$ on drying, after which this was baked in a gas oven for 10 minutes at 190° C.

Next, there was printed on this primer under coat layer letters and characters as indicia by lithography using an ink used in printing on metals consisting of a rosin-modified resin (vehicle), carbon black (pigment), manganese chloride (dryer) and kerosine (solvent) followed by baking in a gas oven for 10 minutes at 150° C. Atop this was then applied as a primer top coat layer a coating material obtained by dissolving and dispersing in 580 parts by weight of a solvent (a 2:1 volume ratio mixture of methyl isobutyl ketone and methyl cellosolve) 55 parts by weight of a vinyl chloride-vinyl acetate copolymer, 15 parts by weight of a bisphenol A type epoxy resin, 45 parts by weight of an alkali resol type phenolic resin obtained by reacting equal parts by weight of phenol and o-cresol, and 1.0 part by weight of the same [polyethylene oxide] *oxidized polyethylene* as that used in the foregoing primer under coat layer, this primer top coat layer being applied in such an amount as to provide a coating of 80 mg/100 $cm^2$ on drying followed by baking in a gas oven for 10 minutes at 190° C. The so treated tinplate was then formed into crown shells so that the primer-coated face would come to the inside of the shell. A crown closure lining apparatus was then used, and low density polyethylene (melt index=7, density 0.923) was deposited in an amount of about 0.5 gram per crown shell followed by punching with a cold moulding punch to manufacture the crown closures having polyethylene liners.

When the liners of the thus obtained crown closures were stripped from the crown shells, liners to which the aforementioned indicia were clearly transferred were obtained.

EXAMPLE 2

A tinplate was coated with the same rust preventive undercoating lacquer as that described in Example 1. Atop this lacquered layer was then applied as a primer under coat layer a coating material obtained by dissolving and dispersing in a solvent (a mixture of equal volumes of methyl isobutyl ketone and methyl ethyl ketone), such that the solids content therein would be 30% by weight, a resinous composition consisting of 60 parts by weight of an epoxy resin of a molecular weight of about 3000 obtained by the condensation of bisphenol A with epichlorohydrin, 30 parts by weight of an alkali resol type phenolic resin obtained by the condensation of equal weights of phenol and o-cresol, and, in an amount shown in Table 1, [a polyethylene oxide] *an*

*oxidized polyethylene* having an average molecular weight of 6500, an acid value of 28.0, a density of 1.00 (g/cc) and an oxygen content of 0.58 weight %, this under coat layer being applied in such an amount as to provide a coating of 50 mg/100 $cm^2$ on drying, after which this was baked in a gas over for 10 minutes at 200° C.

Next, there was printed atop this primer under coat layer the indicia, by lithography, using the same ink for printing on metals as that used in Example 1 followed by baking for 10 minutes at 150° C. in a gas oven. Atop this was then applied as a primer top coat layer a coating material of the same resin and solvent compositions as those used for the foregoing primer under coat layer, except that the amount of the [polyethylene oxide] *oxidized polyethylene* was changed as shown in Table 1, below, the application of this top coat layer being made in such an amount as to provide a coating of 50 mg/100 $cm^2$ on drying, after which it was baked in gas oven for 10 minutes at 200° C. The tinplate thus treated was then formed into crown shells in such a manner that the primer-coated surface would come to the inside of the shells. Thereafter, the experiment was operated as in Example 1 to manufacture the crown closures having polyethylene liners. When the liners were stripped from crown closures obtained in this manner, liners to which the indicia were clearly transferred were obtained as shown in Table 1.

TABLE 1

| Composition of Primer Undercoat Layer | | | Composition of Primer Topcoat Layer | | | Condition of Transfer of Stripped Indicia to Liner |
|---|---|---|---|---|---|---|
| Epoxy Resin | Phenolic Resin | Oxidized polyethylene | Epoxy Resin | Phenolic Resin | Oxidized polyethylene | |
| 60 wt. parts | 30 wt. parts | 7 wt. parts | 60 wt. parts | 30 wt. parts | 10 wt. parts | Good |
| — | — | 15 | — | — | — | — |
| — | — | 30 | — | — | 20 | — |

EXAMPLE 3

A tinplate coated with a rust preventive under coating lacquer was obtained by operating as in Example 1. To the lacquered layer thus obtained was applied as a primer under coat layer a coating material obtained by dissolving and dispersing in a solvent (a mixture of equal amounts of methyl isobutyl ketone and methyl ethyl ketone), such that the solids content therein would be 30% by weight, a resinous composition consisting of 60 parts by weight of an epoxy resin of the same type as hereinbefore described, 25 parts by weight of a phenolic resin of the same type as hereinbefore described and 15 parts by weight of [a polyethylene oxide] *an oxidized polyethylene* having the molecular weight, acid value and density shown in Table 2, below, this under coat layer being applied in such an amount as to provide a coating of 50 mg/100 $cm^2$ on drying, after which it was baked in a gas oven for 10 minutes at 200° C.

Next, the indicia were printed on this primer under coat layer with the same ink for printing on metals as used in Example 1 followed by baking in a gas oven for 10 minutes at 150° C. Atop this was then applied as a primer top coat layer a coating material of the same resin and solvent compositions as the foregoing primer under coat layer, except that the amount of the [polyethylene oxide] *oxidized polyethylene* was changed to 10 parts by weight, this top coat layer being applied in such an amount as to provide a coating of 100 mg/$dm^2$ on drying followed by baking in a gas oven for 10 minutes at 200° C. The tinplate thus treated was then formed into crown shells in such a manner that the primer-coated face would come to the inside of the shell. The subsequent operations were carried out as in Example 1 to manufacture crown closures having polyethylene liners and crown closures having liners of an ethylene-vinyl acetate copolymer resin (vinyl acetate content 30%).

When the liners of crown closures thus obtained were stripped from the crown shells, liners to which the indicia were clearly transferred were obtained as shown in Table 2.

TABLE 2

| Oxidized polyethylene Used in Primer Undercoat Layer | | | | Oxidized polyethylene Used in Primer Topcoat Layer | | | | Condition of Transfer of Indicia to Stripped Liner | |
|---|---|---|---|---|---|---|---|---|---|
| Average Molecular Weight | Acid Value | Oxygen Content (wt. %) | Density (g/cc) | Average Molecular Weight | Acid Value | Oxygen Content (wt. %) | Density (g/cc) | Low Density Polyethylene Liner | Ethylene-Vinyl acetate Copolymer Liner |
| 3000 | 16.0 | 5.36 | 0.93 | 6500 | 28.0 | 4.36 | 1.00 | Good | Good |
| 5000 | 8.0 | 2.48 | 0.96 | — | — | — | — | — | — |
| 6500 | 13.0 | 0.56 | 0.98 | — | — | — | — | — | — |
| — | 18.0 | 4.36 | 1.00 | — | — | — | — | — | — |
| — | — | — | — | 3000 | 16.0 | 5.36 | 0.93 | — | — |
| — | — | — | — | 5000 | 8.0 | 2.48 | 0.96 | — | — |
| — | — | — | — | 6500 | 13.0 | 0.56 | 0.98 | — | — |

EXAMPLE 4

To a tinplate was applied a primer under coat layer by repeating the same operation as in Example 2. Atop the so applied under coat layer was then applied a primer top coat layer of the same composition as that used in said Example 2 in such an amount as to provide a coating of 100 mg/$dm^2$ on drying followed by baking in a gas oven for 10 minutes at 200° C. Indicia were then printed on the primer top coat layer by lithography using the same ink for printing on metals as used in Example 1, after which this was baked for 10 minutes at 150° C. in a gas oven. Thereafter, the tinplate thus obtained was formed into crown shells in such a manner that the printed face would come to the inside of the shell, following which the same operation as in Example 1 were carried out to manufacture crown shells having polyethylene liners.

When the liners of the so obtained crown closures were stripped from the crown shells, liners to which the indicia were clearly transferred were obtained.

We claim:

1. A crown closure having a removable polyolefin liner, said crown closure comprising a crown shell having a primer layer on its inner surface and the polyolefin liner applied to the inside of said crown shell, characterized in that said primer layer is a two-component priming consisting of an under coat layer containing [a polyethylene oxide] *an oxidized polyethylene* and a top coat layer containing [a polyethylene oxide] *an oxidized polyethylene* and at least one compatible resin, with the provision of a printing layer of indicia at the interface between said under coat and top coat layers or atop said top coat layer.

2. A crown closure of claim 1 wherein said polyolefin liner is a polyethylene liner.

3. A crown closure of claim 1 wherein the oxygen content of said [polyethylene oxide] *oxidized polyethylene* is 0.1–10%.

4. A crown closure of claim 1 wherein said [polyethylene oxide] *oxidized polyethylene* has an average molecular weight of 1000–50,000.

5. A crown closure of claim 1 wherein said under coat layer contains [a polyethylene oxide] *an oxidized polyethylene* and at least one other resin.

6. A crown closure of claim 5 wherein said other resin is a thermosetting resin.

7. A crown closure of claim 1 wherein said top coat layer contains, based on said top coat layer, 1–50% by weight of the [polyethylene oxide] *oxidized polyethylene* and 50–99% by weight of said resin component compatible.

8. A crown closure of claim 1 wherein said indicia are printed using ink used for printing on metals.

9. A process for manufacturing a removable crown closure having a polyolefin liner that can be readily removed, said process comprising providing at one face of a metal stock sheet a primer under coat layer containing [a polyethylene oxide] *an oxidized polyethylene,* printing indicia thereon, providing atop said under coat layer a primer top coat layer containing [a polyethylene oxide] *an oxidized polyethylene* and at least one other compatible resin, and thereafter forming said metal stock sheet into crown shells in such a manner that said coating layers come to the inside of the shells, followed by depositing a polyolefin mass in said shells and molding said mass into the form of liners.

10. A process for manufacturing a crown closure having a removable polyolefin liner said process comprising providing at one face of a metal stock sheet a primer under coat layer containing [a polyethylene oxide] *an oxidized polyethylene,* providing atop said under coat layer a top coat layer containing [a polyethylene oxide] *an oxidized polyethylene* and at least one other compatible resin, printing indicia on said top coat layer, and thereafter forming said metal stock sheet into crown shells in such a manner that said coating layers come to the inside of the shells, followed by depositing a polyolefin mass in said shells and molding said mass into the form of liners.

* * * * *